United States Patent [19]

Stamm

[11] 4,419,052
[45] Dec. 6, 1983

[54] TURBINE METER ROTOR

[75] Inventor: Johann A. Stamm, Export, Pa.

[73] Assignee: Rockwell International Corporation, Pittsburgh, Pa.

[21] Appl. No.: 357,104

[22] Filed: Mar. 11, 1982

Related U.S. Application Data

[63] Continuation of Ser. No. 119,343, Feb. 9, 1980.

[51] Int. Cl.³ .................................................. F01D 5/30
[52] U.S. Cl. ........................... 416/214 A; 416/220 R; 73/861.83
[58] Field of Search .............. 415/213 R; 416/93 R, 416/93 A, 93 M, 193 R, 210 R, 210 A, 214 R, 214 A, 220 R, 220 A, 244 R, 212, 219 R; 73/861.79, 861.89, 861.78; 324/174; 336/30

[56] References Cited

U.S. PATENT DOCUMENTS

| 856,586 | 6/1907 | Humphrey | 416/214 R |
| 2,989,285 | 6/1961 | Warnken | 416/214 A |
| 3,189,261 | 6/1965 | Stalker | 416/220 |

FOREIGN PATENT DOCUMENTS

| 139028 | 2/1920 | United Kingdom | 416/193 |
| 918674 | 2/1963 | United Kingdom | 416/219 |

Primary Examiner—Harvey C. Hornsby

[57] ABSTRACT

An improved rotor for fluid flow meters having a rotor hub with a vane hub mounted thereon including spaced inner and outer cylindrical walls. These inner and outer cylindrical walls are provided with grooves and slot respectively that are radially aligned and which are inclined relative to the direction of fluid flow and provide adjacent support surfaces for a plurality of vanes. A cap element assembled on one end of the rotor hub in engagement with the outer cylindrical wall maintains the vanes in operating position and provides a means whereby the vanes can be readily removed or replaced when desired.

15 Claims, 8 Drawing Figures

TURBINE METER ROTOR

This is a continuation of application Ser. No. 119,343, filed Feb. 9, 1980.

BACKGROUND OF THE INVENTION

The present invention pertains to a fluid flow meter such as shown and described in U.S. Pat. No. 3,342,070 and more particularly to an improved rotor therefor.

As is well known to those conversant in the meter art, the flow of water or other liquids through pipelines is commonly measured by means of turbine type meters. The liquid being measured by these meters frequently are contaminated by foreign particles which cause damage to the rotor and in particular to the radially extending vane elements thereof.

Prior to the instant invention it has been common practice to cast or mold rotors as a single integral element, or in other words, the hub of the rotor and the plurality of radially extending vanes extending therefrom are integrally fabricated as one unit. In the smaller size of meters, it is considered economically feasible to replace the entire rotor when it becomes damaged; however, with the larger types of meters such for example, as the 16 inch size, the excessive cost of rotors of this size makes replacement in their entirety prohibitive.

The improved rotor according to the present invention is formed by a plurality of separate elements which can be quickly and easily assembled together as a unit. In the event of breakage or damage to any particular part of the rotor, the broken or damaged part can be replaced in a minimum amount of time and at substantially less expense relative to replacement of the rotor in its entirety.

A number of United States patents show and describe rotor construction and vaned wheel members in which the vanes or so-called blade elements thereof are replaceable and for a more detailed description of their teachings, attention is hereby directed to U.S. Pat. Nos. 292,057, 2,989,285, 3,393,862, 3,565,547, and 4,046,487.

SUMMARY OF THE INVENTION

The improved turbine meter rotor comprising the invention includes a rotor hub that is mounted for rotation within the meter housing. A vane hub is assembled on the rotor hub for rotation therewith and includes a main body portion having inner and outer cylindrical walls that are concentric with the axis of rotation of said rotor hub and extend parallel to the direction of fluid flow. The outer surface of the inner wall is provided with a plurality of grooves that are inclined with respect to the direction of fluid flow and provides a seat for the ends of the plurality of vanes which extend radially from the vane hub. The outer wall includes a plurality of slots which equal the number of grooves provided on the inner wall and are disposed at the same angle of inclination as well as radially aligned with said grooves. The vanes extend from the grooves through the slots and by means of a cylindrical rotor cap threadably attached to one end of the rotor hub and in operative association with the outer wall a means is provided for locking the vanes in operating position as well as providing a means whereby they can be quickly and easily removed and replaced as desired.

It is a general object of the invention to provide an improved rotor for turbine meters that is fabricated from a plurality of changeable elements.

It is a further object of the invention to eliminate the excessive expense of replacing unitary construction type rotors in the larger models of turbine meters.

Another object is to provide an improved rotor of the multiple element type in which anyone of the various elements thereof can be quickly and easily replaced in a minimum amount of time.

These and other objects of the invention will become more fully apparent by reference to the appended claims and as the following detailed description proceeds in reference to the figures of drawing wherein:

DESCRIPTION OF THE PREFERRED EMBODIMENT

As the general construction and operation of turbine meters to which the present invention is applicable as exemplified in U.S. Pat. No. 3,342,070, the disclosure of which is incorporated herein is well-known and familiar to those conversant in the art, and as the invention is entirely concerned with an improved rotor for such meters, it is only considered necessary here to illustrate and describe those parts which are directly concerned with a preferred form of the present invention.

Figure 1:
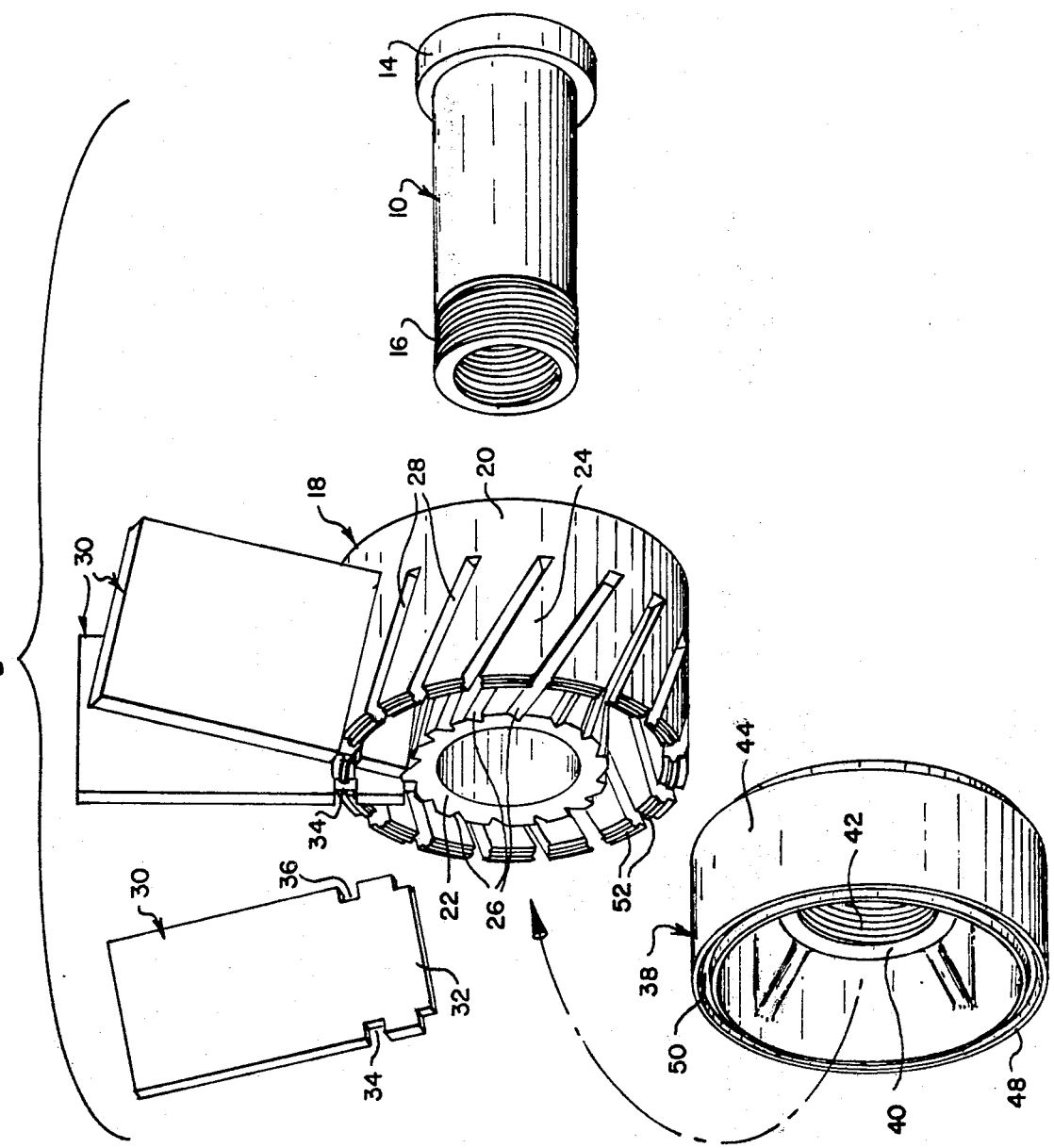
FIG. 1 is a perspective view in exploded form showing the various elements comprising the invention.

Referring now to FIG. 1 the main supporting member for the improved rotor defines a rotor hub that is identified generally by numeral 10 and is rotatably mounted on a shaft 12 (FIG. 4) within the meter housing (not shown) and extends in a direction parallel with the direction of fluid flow. One end of the rotor hub is flanged as at 14 and the opposite end is threaded as at 16 for reasons to be more fully described hereinafter.

A vane hub generally identified by numeral 18 assembles on the rotor hub 10 for rotation therewith and includes a main body portion 20 having inner and outer walls 22 and 24 respectively which are concentric with the axis of rotation of the rotor hub and extend in directions parallel to the direction of fluid flow.

The outer surface of the inner wall includes a plurality of equally spaced recesses or grooves 26 which are inclined relative to the direction of fluid flow. The outer wall 24 has a plurality of equally spaced slots 28 formed therein which are in radial alignment with grooves 26 and are disposed at the same angle of inclination as said grooves. A plurality of vanes identified generally by numeral 30 the total of which corresponds to the number of grooves 26 and slots 28 and as shown in FIG. 1 are adapted to assemble in said grooves and slot in a manner yet to be described. Although the grooves 26 and slots 28 are shown and described as being inclined to the direction of fluid flow, it should be understood that they could be formed as a helix and with vanes that would conform to this configuration.

Figure 2:
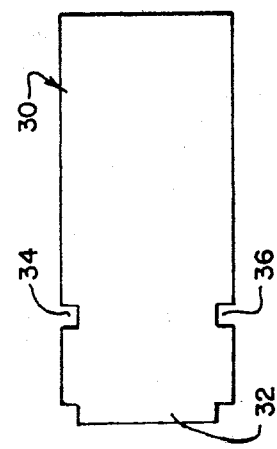
FIG. 2 is a view in side elevation of one of the vanes of the rotor.
Figure 3:
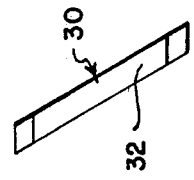
FIG. 3 is an end view of the vane shown in FIG. 2.

Referring to FIGS. 1 and 2, one end of each vane 30 is of reduced width and defines a tongue 32 which when the vane is in its assembled position is caused to seat in one of the grooves 26 provided on the outer surface of the inner wall 22. Referring again to FIGS. 1 and 2, each vane 30 is also of reduced width at a location intermediate the ends thereof and define opposed notches 34 and 36. When the vanes are in their assembled position (FIG. 1), notch 37 of each vane is caused to straddle the inner end of its respective slot 28 and the notch 34 is caused to protrude beyond the slotted end of the outer wall 24.

Figure 4:
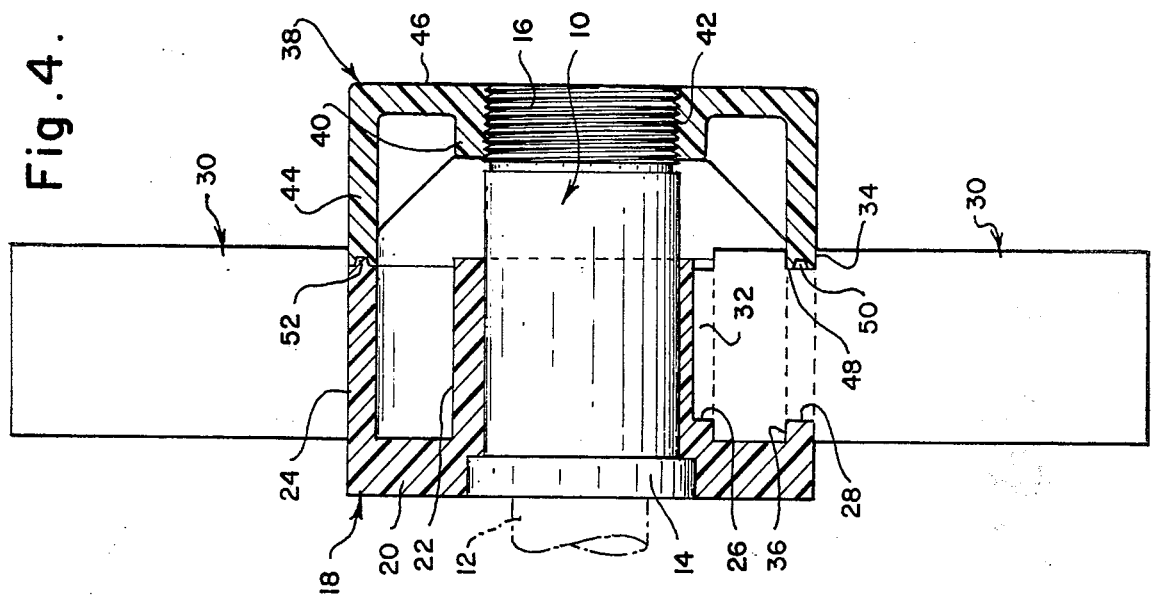
FIG. 4 is a view in side elevation and partially in section showing the various elements of the invention in assembled position.
Figure 5:
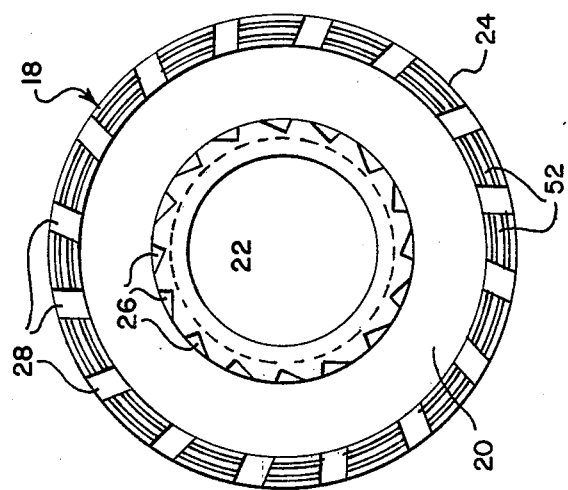
FIG. 5 is an end view of the vane hub showing the radially aligned grooves and slots for supporting the individual vanes.
Figure 6:
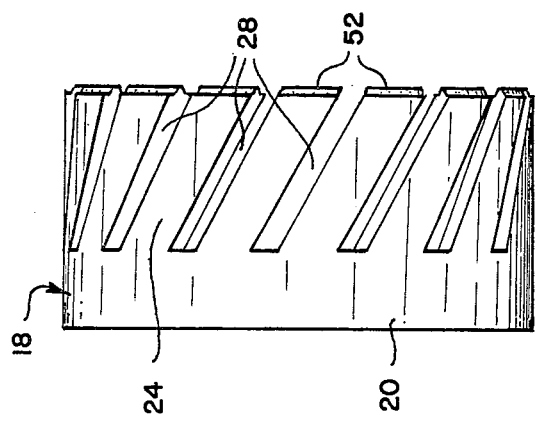
FIG. 6 is a view in side elevation of the vane hub shown in FIG. 5.
Figure 7:
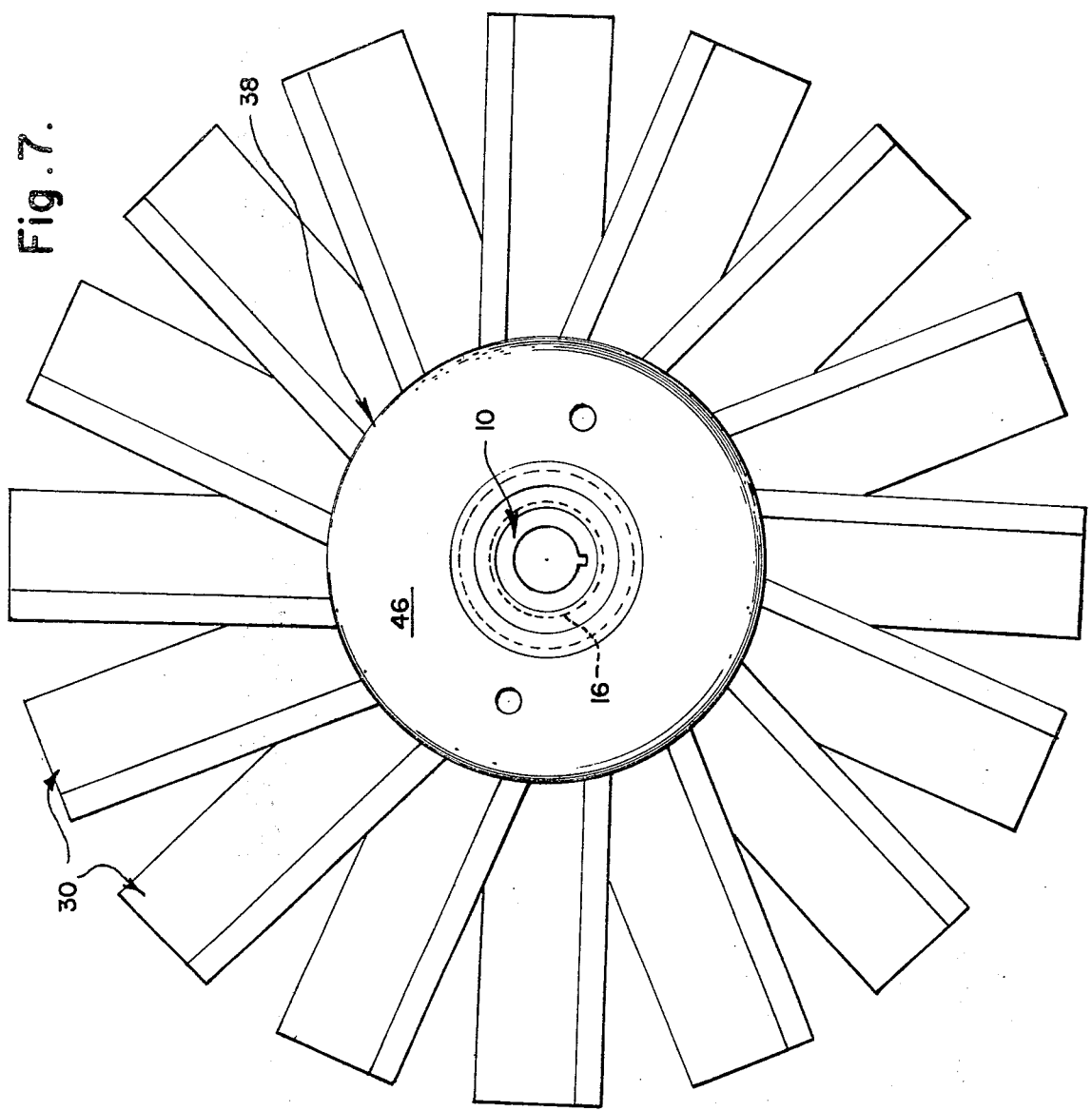
FIG. 7 is an end view of the rotor showing the rotor cap and the plurality of vanes maintained in operating position thereby.
Figure 8:
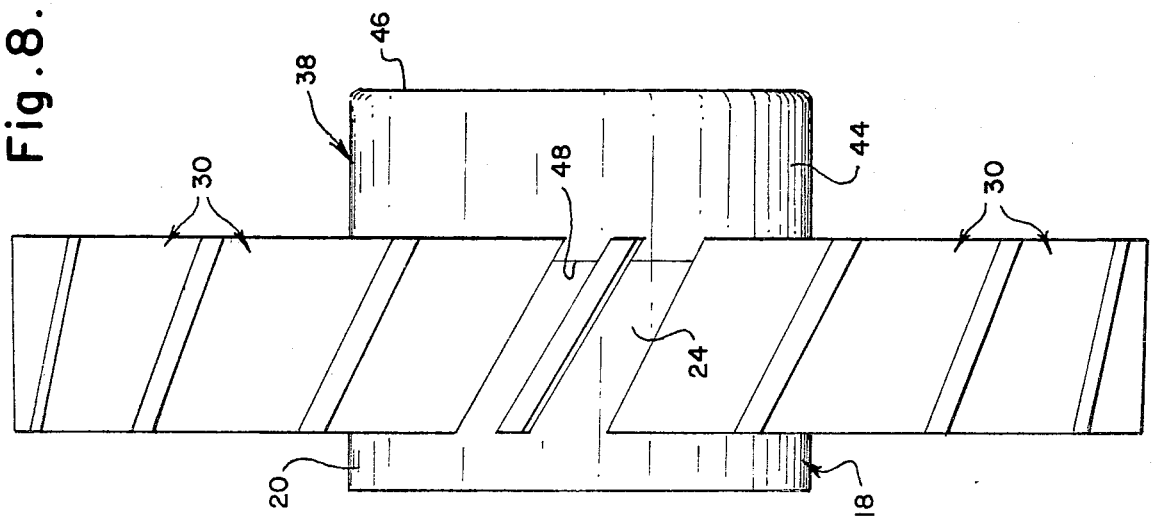
FIG. 8 is a view in side elevation of the rotor shown in FIG. 7.

As shown in FIG. 4, a portion of the rotor hub 10 and its threaded end 16 extend beyond the end of the inner wall 22 and provides a means for the assembly of a rotor cap thereon which is depicted generally by numeral 38. This rotor cap includes a centrally disposed boss 40 having a threaded opening 42 extending therethrough and an integrally formed and radially spaced outer cylindrical wall 44 that is concentric with said boss and is of a diameter corresponding to that of the vane hub's outer wall 24. As shown in FIGS. 4, 7 and 8, the boss 40 and the outer cylindrical wall 44 are interconnected by a circular planar surface 46 and said cylindrical wall extends for a greater distance than said boss to define a circular end surface 48, (FIG. 1). This end surface 48 is provided with a circular groove 50 (FIG. 1) which in the cap's assembled position is adapted to receive a plurality of arcuate lips 52 (FIGS. 1 and 4) of conforming configuration which are provided on the end of the outer wall 24 intermediate the outer end of each of the slots 28.

With the threaded end 16 of the rotor hub 10 being located in spaced relation to the end of the inner wall 22 of the vane hub 18 and with the plurality of vanes being disposed so as to extend from a groove 26 through a radially aligned slot 28, the rotor cap 38 is assembled onto said threaded end 16 until the circular end surface 48 firmly engages the slotted end of the outer wall 24. It will be understood that in assembled position the rotor cap 38 is swung from the position shown in FIG. 1 to that shown in FIG. 4. With the rotor cap 38 in its assembled position, its cylindrical surfaces immediately adjacent to the slotted end of the outer wall 24 are disposed within the notches 34 of the vanes 30 and provide the necessary means for fixing said vanes in their operating positions. In the event of a damaged or broken vane, one simply has to disassemble the rotor cap, remove the defective vane or vanes and then reassemble said rotor cap.

The arrangement described above provides a simple, sturdy rotor assembly which may be quickly and easily disassembled in field to replace damaged parts. By anchoring the roots of the blades in the inner wall and further supporting the blades radially outward from their roots with the outer wall, a particularly rigid rotor structure is provided. Moreover, the blades are firmly supported against outward radial movement by virtue of the portions of the outer wall 24 and portions of the rotor cap 38 are respectively received into notches 36 and 34 in the blades.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A fluid meter having a housing with inlet and outlet openings, a rotor, including vanes, rotatably supported in said housing to be driven by fluid flow therethrough, an improved rotor construction including:
   (a) a rotor hub rotatably mounted on a shaft having an axis parallal to the direction of fluid flow;
   (b) a vane hub mounted on said rotor hub and having a main body portion with radially spaced inner and outer axially extending cylindrical walls concentric with the axis of rotation of said rotor hub;
   (c) substantially axially extending recesses in said inner wall to receive the ends of vanes;
   (d) substantially axially extending recesses in said outer wall in radial alignment with said recesses in said inner wall;
   (e) said recesses in said inner and outer walls respectively opening to corresponding ends of said inner and outer walls;
   (f) a plurality of vanes each of which has an end supported in a recess in said inner wall and an intermediate portion supported in a corresponding recess in said outer wall;
   (g) retaining means attached to the end of said rotor hub corresponding to said ends of said walls to hold said vanes in said recesses.

2. The structure according to claim 1 wherein one end of each vane defines a tongue for assembly in a recess in said inner wall and having a configuration conforming thereto.

3. The structure according to claim 1 wherein said vanes are formed intermediate their ends with opposed notches disposed for operative association respectively with the inner ends of the recesses in said outer wall and said retaining means.

4. The structure according to claim 3 wherein said retaining means defines a cylindrical cap threadably attached to said rotor hub with one end thereof being disposed in locking engagement with the end of said vane hub with which said recesses communicate.

5. The structure according to claim 1 wherein said recesses extend for a substantial portion of the width of said inner and outer walls respectively.

6. The structure according to claim 1 wherein the recesses in said inner wall and the recesses in said outer wall are similarly inclined with respect to the direction of fluid flow through said meter.

7. A turbine rotor comprising a vane hub having radially spaced axially extending cylindrical walls concentric with the axis of rotation of said rotor, means on said walls for supporting each of a plurality of blades at radially spaced points on each of said blades comprising a plurality of circumferentially spaced axially extending recesses in said walls, the recesses in one wall being radially aligned with respective corresponding recesses in the other wall, a plurality of rotor vanes each of which is removably received in respective radially aligned corresponding recesses in said walls.

8. The rotor defined in claim 7 in which said recesses extend to radially aligned ends of the respective walls whereby said vanes may be inserted into said recesses from said ends of said walls.

9. The rotor defined in claim 8 together with a rotor cap detachably fixed with respect to said hub and having a portion axially aligned with said ends of said walls to close the corresponding ends of said recesses and thereby hold said vanes in said recesses.

10. The rotor defined in claim 9 in which said one of said walls is the radially outermost wall.

11. The rotor defined in claim 10 in which said vanes have means which cooperate with means in said hub and said rotor cap to prevent radially outward movement of said vanes.

12. The rotor defined in claim 11 in which said means on said vanes is comprised of notches in opposite edges of said vanes into which notches are respectively received a portion of said outer wall and a portion of said rotor cap.

13. The rotor defined in claim 11 together with a rotor hub received into co-axial bores through said inner wall of said vane hub and said rotor cap, and means for securing said rotor cap to said rotor hub whereby the entire assembly comprised of said rotor hub, vane hub, rotor cap and said vanes is secured together to form a rigid unitary rotor structure.

14. A turbine meter rotor comprising a vane hub having radially spaced axially extending inner and outer cylindrical walls concentric with the axis of rotation of said rotor, a plurality of circumferentially spaced substantially axially extending recesses in said outer wall, circumferentially spaced substantially axially extending recesses in said inner wall each of which corresponds to and is aligned with a respective recess in said outer wall, the recesses in each of said walls extending to corresponding ends of their respective walls, a plurality of rotor vanes each of which is removably received in corresponding recesses in said inner and outer walls, a rotor cap detachably secured to said vane hub to close said one end of said recesses in said outer wall to secure said vanes against axial movement with respect to said recesses and cooperating means on said vanes and on said vane hub and rotor cap to prevent radially outward movement of said vanes.

15. The rotor defined in claim 14 in which the recess in said inner and outer wall are similarly inclined with respect to the direction of the fluid flow through said meter.

* * * * *